(12) United States Patent
Okazaki

(10) Patent No.: US 8,309,012 B2
(45) Date of Patent: Nov. 13, 2012

(54) METHOD FOR PRODUCING CERAMIC HONEYCOMB STRUCTURE

(75) Inventor: Syunji Okazaki, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 384 days.

(21) Appl. No.: 12/281,669

(22) PCT Filed: Sep. 25, 2007

(86) PCT No.: PCT/JP2007/068548
§ 371 (c)(1),
(2), (4) Date: Sep. 4, 2008

(87) PCT Pub. No.: WO2008/041548
PCT Pub. Date: Apr. 10, 2008

(65) Prior Publication Data
US 2009/0008811 A1    Jan. 8, 2009

(30) Foreign Application Priority Data

Sep. 25, 2006  (JP) ................................ 2006-258594

(51) Int. Cl.
*C04B 33/32* (2006.01)
(52) U.S. Cl. .......................................... 264/630; 264/43
(58) Field of Classification Search ................ 264/630, 264/63, 43, 631, 44
See application file for complete search history.

(56) References Cited

U.S. PATENT DOCUMENTS

| | | | | |
|---|---|---|---|---|
| 3,176,054 A | * | 3/1965 | Einstein et al. | 264/44 |
| 2004/0051196 A1 | * | 3/2004 | Otsuka et al. | 264/41 |
| 2005/0101479 A1 | * | 5/2005 | Morimoto et al. | 502/263 |
| 2005/0143255 A1 | | 6/2005 | Morimoto et al. | |
| 2005/0253311 A1 | * | 11/2005 | Nakamura et al. | 264/630 |
| 2006/0154021 A1 | * | 7/2006 | Ohno et al. | 428/116 |
| 2008/0318759 A1 | * | 12/2008 | Richet et al. | 501/80 |

FOREIGN PATENT DOCUMENTS

| | | |
|---|---|---|
| JP | 2003-292388 A | 10/2003 |
| JP | 2005-230782 A | 9/2005 |

OTHER PUBLICATIONS

Norton, F.H. Elements of Ceramics. Reading, Addison-Wesley, 1970. p. 89-90.*

\* cited by examiner

*Primary Examiner* — Matthew Daniels
*Assistant Examiner* — Erin Snelting
(74) *Attorney, Agent, or Firm* — Sughrue Mion, PLLC

(57) ABSTRACT

A method for producing a ceramic honeycomb structure comprising the steps of mixing and blending at least a ceramic material and a pore-forming material to form a moldable material, extrusion-molding the moldable material, and drying and sintering the resultant molded honeycomb article, the amount of the pore-forming material added being adjusted depending on the packed bulk density of the pore-forming material.

4 Claims, 2 Drawing Sheets

Fig. 1
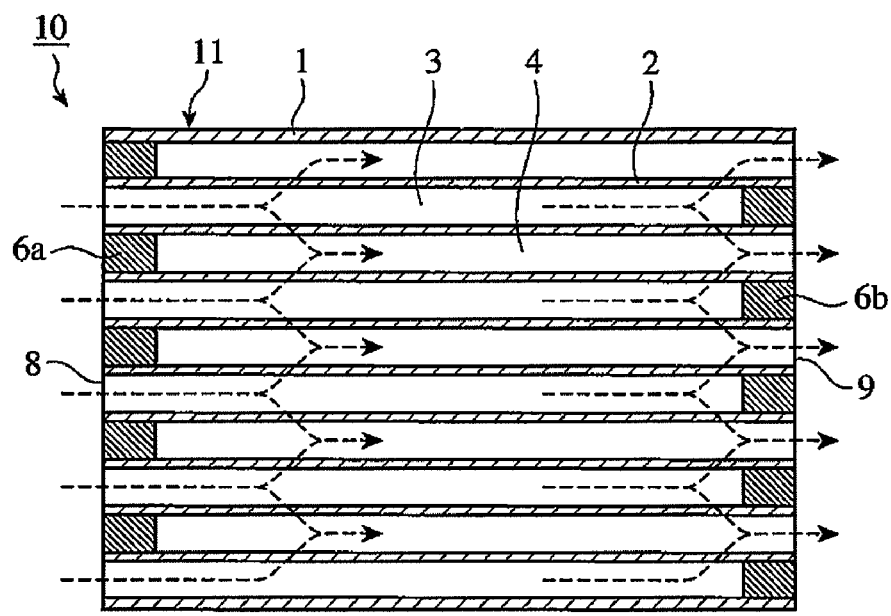
Fig. 2(a)     Fig. 2(b)
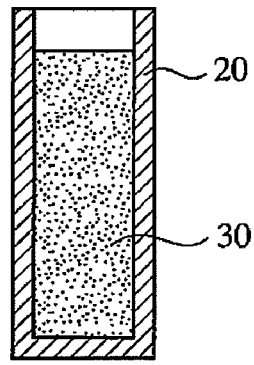
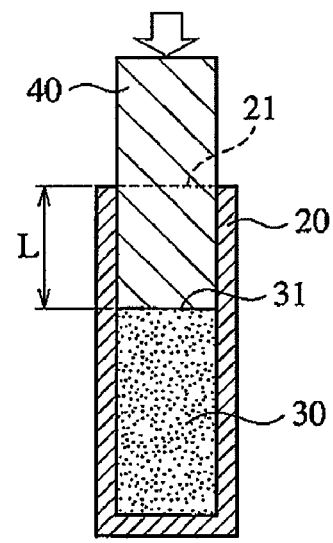

US 8,309,012 B2

METHOD FOR PRODUCING CERAMIC HONEYCOMB STRUCTURE

CROSS REFERENCE TO RELATED APPLICATIONS

This application is a National Stage of International Application No. PCT/JP2007/068548 filed Sep. 25, 2007, claiming priority based on Japanese Patent Application No. 2006-258594 filed Sep. 25, 2006, the contents of all of which are incorporated herein by reference in their entirety.

FIELD OF THE INVENTION

The present invention relates to a method for producing a ceramic honeycomb structure for constituting an exhaust-gas-cleaning honeycomb filter, etc.

BACKGROUND OF THE INVENTION

An exhaust gas emitted from diesel engines contains fine particles (particulate matter) based on carbon such as soot and high-boiling-point hydrocarbons. When such exhaust gas is released in the atmosphere, it may adversely affect human beings and the environment. For this reason, a ceramic honeycomb filter, which may be called "honeycomb filter" in short later, has been disposed in an exhaust pipe connected to a diesel engine to purify an exhaust gas by removing particulate matter. As shown in FIG. 1, a honeycomb filter 10 comprises a ceramic honeycomb structure 11 comprising porous cell walls 2 forming a lot of flow paths 3, 4, and an outer peripheral wall 1, and plugs 6a, 6b alternately sealing both ends 8, 9 of the flow paths 3, 4 in a checkerboard pattern. An exhaust gas flows into the outlet-side-sealed flow paths 3, passes through the cell walls 2, and exits from the inlet-side-sealed flow paths 4. While the exhaust gas is passing through pores on and in the cell walls, particulate matter is captured on the cell wall surface and in the pores. A large pore size reduces pressure loss while the exhaust gas passes through the honeycomb filter, but lowers a particulate-matter-capturing ratio. On the contrary, a small pore size increases the capturing ratio as well as the pressure loss. Too small a total pore volume increases the pressure loss, while too large a total pore volume lowers the strength of the honeycomb filter. Accordingly, the pore size and the pore volume are controlled depending on applications, by adjusting the amount of a pore-forming material such as coal powder and wheat powder added to a material powder. Recently, the gas-containing, hollow resin microcapsules described in JP 2003-38919 A have come to be used in place of the coal powder and the wheat powder as a pore-forming material.

With unevenness among production lots, microcapsules in different production lots may provide sintered honeycomb structures with different pore volumes, even if they are added in the same amount to ceramic powder. The pore volume of the sintered honeycomb structure may be called simply "pore volume" below.

WO 2005/068398 discloses a method for producing a honeycomb structure stably having a constant pore volume even if microcapsules stored for a long period of time are used, by regulating the weight of a gas contained in the microcapsules stored at 40° C. for 4 weeks. However, the method described in WO 2005/068398 needs a preliminary test of storing microcapsules at 40° C. for 4 weeks, making it difficult to know a proper amount of the pore-forming material to be added in a short period of time if the production lots of microcapsules are changed. Accordingly, this method fails to cope with a rapid production change, and needs high cost in storing microcapsules.

JP 2005-314218 A discloses a method for producing a porous structure having stable pore properties comprising extrusion-molding part of an extrusion material for honeycomb structures whenever material lots are changed, measuring the pore properties of its molded article after sintering to have information about the unevenness of the extrusion material, and adjusting the amounts of a pore-forming material and water added to the material based on the information. The method described in JP 2005-314218 A, however, needs a lot of time in molding, sintering and evaluation, making it difficult to know a proper amount of a pore-forming material in a short period of time. It also suffers a high production cost.

As described above, the conventional technologies need a lot test of a pore-forming material over a long period of time. Accordingly, a technology capable of easily stabilizing the pore volume of the honeycomb structure in a short period of time has been demanded.

OBJECT OF THE INVENTION

Accordingly, an object of the present invention is to provide a method for producing a honeycomb structure having a stable pore volume at a low cost, which can adjust the amount of a pore-forming material to a proper value in a short period of time even when the conditions of microcapsules are changed.

DISCLOSURE OF THE INVENTION

As a result of extensive investigation in view of the above object, the inventors have found that by utilizing a strong correlation between the packed bulk density of microcapsules and the pore volume of the resultant honeycomb structure, it is possible to determine a proper amount of the microcapsules added to provide a honeycomb structure with a desired pore volume. The present invention has been completed based on such finding.

Thus, the method of the present invention for producing a ceramic honeycomb structure comprises mixing and blending ceramic material powder with a pore-forming material composed of microcapsules to form a moldable material, extrusion-molding the moldable material, and drying and sintering the resultant molded honeycomb article, the amount of the microcapsules added being adjusted depending on the packed bulk density of the microcapsules.

Another method of the present invention for producing a ceramic honeycomb structure comprises mixing and blending ceramic material powder with a pore-forming material composed of microcapsules to form a moldable material, extrusion-molding the moldable material, and drying and sintering the resultant molded honeycomb article, and to obtain a ceramic honeycomb structure having the same pore volume as that of a ceramic honeycomb structure produced by adding microcapsules A having a packed bulk density Q1 (g/cm$^3$) in an amount M1 (% by mass) to the ceramic material, the amount M2 (% by mass) of microcapsules B having a packed bulk density Q2 (g/cm$^3$) added to the ceramic material being adjusted such that M2>M1, when Q1>Q2, and M2<M1, when Q1<Q2.

A further method of the present invention for producing a ceramic honeycomb structure comprises mixing and blending ceramic material powder with a pore-forming material composed of microcapsules to form a moldable material, extrusion-molding the moldable material, and drying and sintering the resultant molded honeycomb article, the amount of microcapsules depending on the packed bulk density being determined from the relation between the packed bulk density of the microcapsules and the pore volume of the ceramic honeycomb structure, and the relation between the amount of microcapsules added and the pore volume of the ceramic honeycomb structure, thereby providing a ceramic honeycomb structure with a desired pore volume.

A still further method of the present invention for producing a ceramic honeycomb structure comprises mixing and blending ceramic material powder with a pore-forming material composed of microcapsules to form a moldable material, extrusion-molding the moldable material, and drying and sintering the resultant molded honeycomb article, at least two types of microcapsules having different packed bulk densities being mixed to provide the mixed microcapsules with an adjusted packed bulk density.

A still further method of the present invention for producing a ceramic honeycomb structure comprises mixing and blending ceramic material powder with a pore-forming material composed of microcapsules to form a moldable material, extrusion-molding the moldable material, and drying and sintering the resultant molded honeycomb article, the microcapsules having a packed bulk density of 0.13 to 0.17 $g/cm^3$ at a compression force of 0.13 MPa.

The microcapsules preferably have a specific surface area of 0.058 to 0.218 $m^2/ml$.

BRIEF DESCRIPTION OF THE DRAWINGS

FIG. 1 is a schematic cross-sectional view showing an example of ceramic honeycomb filters.

FIG. 2 is a schematic view showing a method for measuring a packed bulk density.

DESCRIPTION OF THE BEST MODE OF THE INVENTION

[1] Production Method

Figure 3:
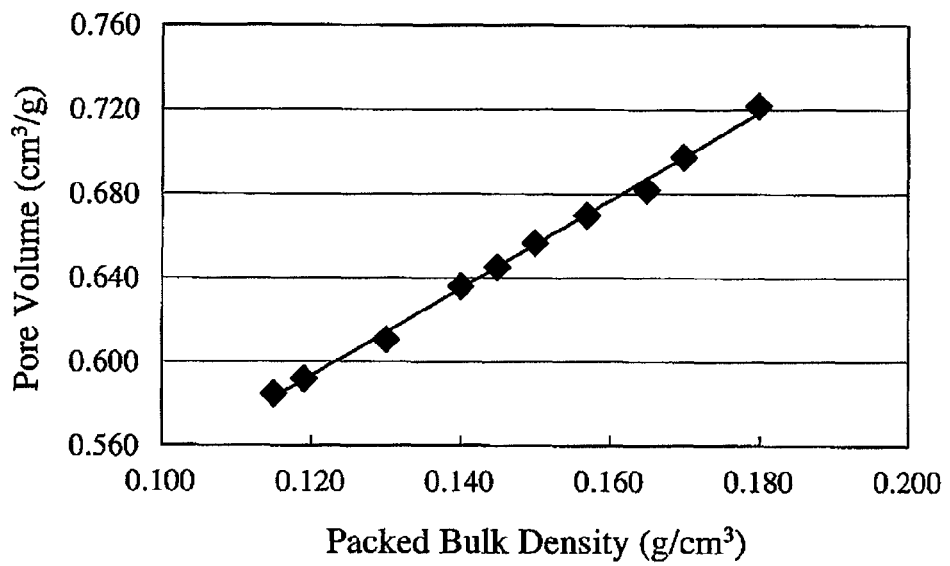
FIG. 3 is a graph showing the relation between the packed bulk density of microcapsules and the pore volume of a honeycomb structure.

The present invention provides a method for producing a ceramic honeycomb structure comprising adjusting the amount of microcapsules added depending on the packed bulk density of the microcapsules, which has a strong correlation with the pore volume. This method provides a ceramic honeycomb structure with smaller pore volume variations among production lots, as compared with conventional methods of adding microcapsules in a constant amount to ceramic powder. Although the unevenness of an extrusion material should conventionally be known for every material lot by measuring pore properties after sintering, the method of the present invention can adjust the amount of microcapsules to a proper value in a short period of time, thereby obtaining a honeycomb structure with a stable pore volume.

(1) Relation Between Packed Bulk Density and Pore Volume

Considering that even if the same amount of microcapsules are added, the resultant honeycomb structures may have different pore volumes because the true volumes of the microcapsules per a unit mass vary, the inventor has come to an idea of measuring a packed bulk density to know the true volume of microcapsules. The inventor first considered that with respect to the microcapsules, a larger true volume provides a smaller packed bulk density, resulting in a honeycomb structure with a larger pore volume. However, experiment has surprisingly revealed that a larger packed bulk density provides a larger pore volume.

Namely, when microcapsules are added in a constant mass to ceramic powder, microcapsules with a smaller packed bulk density provides a honeycomb structure with a smaller pore volume, while those with a larger packed bulk density provides a honeycomb structure with a larger pore volume, not with a desired pore volume. Accordingly, when microcapsules with a small packed bulk density are used, increase in their amount makes it possible to obtain a honeycomb structure with a desired pore volume. On the contrary, when microcapsules with a larger packed bulk density are used, decrease in their amount makes it possible to obtain a honeycomb structure with a desired pore volume.

The reason why the use of microcapsules with a larger packed bulk density provides the resultant honeycomb structure with a larger pore volume is not necessarily clear but may be considered as follows. The large packed bulk density means that the microcapsules has a wide particle size distribution range, with a lot of microcapsules having relatively small particle sizes. The existence of microcapsules having small particle sizes in a moldable material makes distances between microcapsules smaller, resulting in increased communications of pores and thus an improved pore volume. In the present invention, the pore volume is measured by mercury porosimetry.

It is also considered that microcapsules with small particle sizes (30 μm or less) are resistant to breakage by ceramic material particles when blended therewith, resulting in an increased amount of an effective pore-forming material and thus an increased pore volume.

(2) Relation Between Amount of Microcapsules and Pore Volume

The relation between the amount of microcapsules added and the pore volume of the ceramic honeycomb structure is determined by the production of ceramic honeycomb structures with varied amounts of microcapsules having the same packed bulk density. Accordingly, the measurement of the packed bulk density of the microcapsules used makes it possible to predict the pore volume of the resultant honeycomb structure from the above-described relation between the packed bulk density of the microcapsules and the pore volume of the ceramic honeycomb structure, and then to determine the amount of microcapsules added for obtaining the desired pore volume from the relation between the amount of microcapsules added and the pore volume of the ceramic honeycomb structure.

(3) Packed Bulk Density

The packed bulk density means a bulk density of microcapsules under a predetermined compression force. A method for measuring the packed bulk density of microcapsules will be explained. As shown in FIG. 2, microcapsules 30 are charged into a tubular container 20 of 30 mm in inner diameter and 100 mm in depth [as shown in (a)], and a bulk of microcapsules 30 in the container 20 is compressed with a rod 40 of about 30 mm in outer diameter at a predetermined compression force (for instance, 0.13 MPa) [as shown in (b)]. In this state, the distance L between an opening end 21 of the container 20 and an upper surface 31 of the compressed bulk of microcapsules 30 is measured to determine the volume of the compressed bulk of microcapsules 30. The mass of microcapsules 30, which is calculated by subtracting the mass of the container 20 from the total mass of the microcapsules 30 and the container 20, is divided by the volume of the compressed bulk of the microcapsules 30 to determine the packed bulk density of the microcapsules 30. The above compression force is obtained by dividing a force of the rod 40 pushing the microcapsules 30 by the area of an upper surface 31 of the bulk of microcapsules 30 (=a cross section area of an inner space of the tubular container 20), and preferably 0.08 to 0.2 MPa. With the compression force of 0.08 to 0.2 MPa, there is a high correlation between the pore volume and the packed bulk density. The compression force is more preferably 0.12 to 0.13 MPa, most preferably 0.13 MPa.

(4) Specific Designing Examples

Assuming that microcapsules A having a packed bulk density Q1 (g/cm$^3$) are added in an amount M1 (% by mass) to a ceramic material to produce a honeycomb structure A having a pore volume V1 (cm$^3$/g), explanation will be made on a method for producing a honeycomb structure B having a pore volume V2 (cm$^3$/g), which is the same as the pore volume V1 (cm$^3$/g) of the honeycomb structure A, using microcapsules B having a packed bulk density Q2 (g/cm$^3$).

(a) When Q1>Q2, namely when the packed bulk density Q2 of the microcapsules B is smaller than the packed bulk density Q1 of the microcapsules A, the addition of the microcapsules B in an amount of M2 (% by mass) equal to M1 provides a smaller pore volume because of the smaller packed bulk density, namely V1>V2. To make the pore volume V2 of the honeycomb structure B close to the pore volume V1 of the honeycomb structure A, the amount of the microcapsules B added should be more than the amount M1 of the microcapsules A. Namely, M1<M2 should be met.

(b) When Q1<Q2, namely when the packed bulk density Q2 of the microcapsules B is more than the packed bulk density Q1 of the microcapsules A, the addition of the microcapsules B in an amount of M2 (% by mass) equal to M1 provides a larger pore volume because of the larger packed bulk density, namely, V1<V2. To make the pore volume V2 of the honeycomb structure B close to the pore volume V1 of the honeycomb structure A, the amount of the microcapsules B added should be smaller than the amount M1 of the microcapsules A. Namely, M1>M2 should be met.

To obtain a ceramic honeycomb structure having the same pore volume as that of the ceramic honeycomb structure produced by adding microcapsules A having a packed bulk density Q1(g/cm$^3$) in an amount M1 (% by mass) to a ceramic material, the amount M2 (% by mass) of microcapsules B having a packed bulk density Q2 (g/cm$^3$) added to the ceramic material should be adjusted to meet M2>M1 when Q1>Q2, and M2<M1 when Q1<Q2. This provides a honeycomb structure with less pore volume variations among production lots, than when a constant percentage of microcapsules are added to the ceramic powder as in the conventional methods. This also makes it possible to adjust the amount of microcapsules to a proper value in a short period of time, without knowing pore properties after sintering and the unevenness of an extrusion material for every lot as in the conventional methods.

(5) Method of Mixing Microcapsules Having Different Packed Bulk Densities

Mixing two or more types of microcapsules having different packed bulk densities, such that the desired packed bulk density is achieved, a honeycomb structure having a stable pore volume can be obtained. Microcapsules having the targeted packed bulk density Q are obtained by mixing microcapsules having a packed bulk density Q1 larger than the packed bulk density Q with microcapsules having a packed bulk density Q2 smaller than the packed bulk density Q in an appropriate proportion. With adjustment such that the microcapsules has a constant packed bulk density, the variations of the pore volume of the honeycomb structure among production lots can be minimized. Such production method provides a honeycomb structure with a stable pore volume even though there are variations in properties among microcapsule lots.

(6) Method of Regulating with Packed Bulk Density

Using only microcapsules having a packed bulk density in a predetermined range, honeycomb structures with little pore volume variations among production lots can be obtained. Particularly using microcapsules having packed bulk densities in a range of 0.13 to 0.17 g/cm$^3$ at a compression force of 0.13 MPa, honeycomb structures having a stable pore volume can be obtained. The more preferable packed bulk density of microcapsules is 0.14 to 0.16 g/cm$^3$.

(7) Specific Surface Area of Microcapsules

A moldable material obtained by mixing a ceramic material and microcapsules, etc. and then adding water may have different hardness depending on the specific surface area of the microcapsules, even if the amount of water added is constant, so that its extrusion moldability is affected. In order that the moldable material has improved moldability, the microcapsules preferably have a specific surface area of 0.058 to 0.218 m$^2$/ml. When the microcapsules have a specific surface area of more than 0.218 m$^2$/ml, the moldable material has such high hardness that it does not smoothly flow in an extrusion die. When the microcapsules have a specific surface area of less than 0.058 m$^2$/ml, the extrusion-molded article is likely deformed by its own weight. The specific surface area of the microcapsules is more preferably 0.13 to 0.18 m$^2$/ml, most preferably 0.14 to 0.17 m$^2$/ml. The specific surface area of the microcapsules is measured by a particle size distribution analyzer of Microtrac.

(8) Production Steps

The production method of the present invention may comprise the steps of determining the correlation between the packed bulk density of the microcapsules (pore-forming material) and the pore volume, and adjusting the amount of microcapsules added depending on the packed bulk density of the microcapsules used.

Another production method of the present invention may comprise the steps of determining the correlation between the packed bulk density of the microcapsules (pore-forming material) and the pore volume, determining the correlation between the amount of microcapsules added and the pore volume, and adjusting the amount of microcapsules added depending on the packed bulk density of the microcapsules used.

[2] Materials (1) Microcapsules

Each microcapsule used in the present invention is a foamed resin constituted by a resin shell containing a gas, which is mixed as a pore-forming material with a ceramic material. Resins are not particularly restricted, but preferably homopolymers or copolymers of acrylic monomers, methacrylic monomers, carboxylic acid monomers, etc. The shell thickness is preferably 0.1 to 0.8 μm. The moisture content of the above microcapsules is preferably 70 to 95%. Because the average particle size of the microcapsules affects the average pore size of the honeycomb structure, it is appropriately selected depending on the average pore size target. The average particle size of 38 to 60 μm preferably provides a strong correlation between the packed bulk density of the microcapsules and the pore volume. The microcapsules may be microballoons described in JP 2003-38919 A, etc. The amount of microcapsules added is preferably 4 to 12% by mass, more preferably 6 to 10% by mass, based on the ceramic material. Although a liquid-containing, pore-forming resin is also called "microcapsule," the term "microcapsules" used herein means a foamed resin containing a gas.

(2) Ceramic Materials

The ceramic materials are not particularly restricted, but may have any compositions as long as they are usable for honeycomb structures. The ceramic material preferably comprises at least one of cordierite, alumina, mullite, silicon nitride, sialon, silicon carbide, aluminum titanate, aluminum nitride, LAS, etc. Among them, a ceramic honeycomb structure made of cordierite as a main crystal is preferable, because it has good heat resistance, a low thermal expansion coefficient, and excellent heat shock resistance, and because it can be produced at a low cost.

In the present invention, the pore-forming material may contain, in addition to the microcapsules, one or more types of powder including carbon-based powder such as graphite powder, wheat powder, starch powder such as corn starch, and resin powder such as polyethylene terephthalate powder and polymethyl methacrylate powder.

The present invention will be described in detail with reference to Examples below without intension of limitation.

(1) Properties of Microcapsules

With respect to 10 types of microcapsules A to J shown in Table 1, which were made of the same material and had different average diameters, the packed bulk density was determined by the following procedures. As shown in FIG. 2(a), each type of microcapsules 30 were charged into a tubular container 20 of 30 mm in inner diameter and 100 mm in depth. As shown in FIG. 2(b), the microcapsules 30 in the container 20 was compressed by a rod 40 having an outer diameter of about 30 mm at 0.13 MPa. In this state, the distance L between an opening end 21 of the container 20 and an upper surface 31 of a bulk of the microcapsules 30 was measured to determine the volume of the compressed bulk of microcapsules 30. The mass of the microcapsules 30 obtained by subtracting the mass of the container 20 from the total mass of the microcapsules 30 and the container 20 was divided by the volume of the compressed bulk of microcapsules 30 to determine the packed bulk density of the microcapsules. The specific surface areas and particle sizes of the microcapsules A to J were measured by a particle size distribution analyzer of Microtrac. The results are shown in Table 1.

(2) Formation of Molded Honeycomb Article

8% by mass of each of the above microcapsules A to J was added to cordierite-forming material powder comprising oxide ceramic powder having the adjusted composition comprising kaolin, talc, molten silica, aluminum oxide and aluminum hydroxide. With a proper amount of methylcellulose as a molding aid and water added, mixing and blending were conducted to prepare 10 types of moldable materials of Test Nos. 1 to 10 shown in Table 1. Each of 10 types of moldable materials was extrusion-molded through a known honeycomb-structure-forming die in a gravity direction, and dried to produce each molded honeycomb article. The moldability of these molded honeycomb articles was evaluated by the following standards. The results are shown in Table 1.

Excellent: A molded honeycomb article having no problems in appearance at all was obtained.

Good: A molded honeycomb article having no problems in appearance but slight cracks and deformation in cell walls was obtained.

Poor: A molded honeycomb article having cracks and deformation in cell walls that caused problems in appearance was obtained.

When the specific surface area of microcapsules was larger than 0.218 $m^2$/ml (Test Nos. 1 and 2) or smaller than 0.058 $m^2$/ml (Test Nos. 8 to 10), the molded honeycomb articles suffered no problems in appearance, but undesirably had slight cracks and deformation in cell walls.

The above 10 types of molded honeycomb articles were dried and sintered to obtain 10 types of honeycomb structures (Test Nos. 1 to 10) each having a cell wall thickness of 0.3 mm, a cell wall pitch of 1.5 mm, an outer diameter of 267 mm and a length of 304 mm. The pore volume of each honeycomb structure was measured by mercury porosimetry. The results are shown in Table 1. The graph of FIG. 3 shows the relation between the packed bulk densities of the microcapsules A to J of Test Nos. 1 to 10 and the pore volumes of the honeycomb structures. FIG. 3 indicates that the packed bulk density of the microcapsules was proportional to the pore volume of the honeycomb structure. An approximated line in FIG. 3 is expressed by the equation of pore volume=2.083× packed bulk density+0.3444.

TABLE 1

| Test No. | Sample | Microcapsules | | | Moldable Material Moldability | Honeycomb Structure Pore Volume ($cm^3$/g) |
| | | Average Diameter (μm) | Packed Bulk Density (g/$cm^3$) | Specific Surface Area ($m^2$/ml) | | |
| --- | --- | --- | --- | --- | --- | --- |
| 1 | A | 38.2 | 0.180 | 0.232 | Good | 0.722 |
| 2 | B | 40.8 | 0.170 | 0.222 | Good | 0.698 |
| 3 | C | 44.4 | 0.150 | 0.218 | Excellent | 0.657 |
| 4 | D | 44.5 | 0.165 | 0.16 | Excellent | 0.682 |
| 5 | E | 54.7 | 0.157 | 0.058 | Excellent | 0.670 |
| 6 | F | 50.6 | 0.145 | 0.14 | Excellent | 0.645 |
| 7 | G | 46.2 | 0.140 | 0.10 | Excellent | 0.636 |
| 8 | H | 55.0 | 0.130 | 0.053 | Good | 0.611 |
| 9 | I | 53.1 | 0.115 | 0.05 | Good | 0.585 |
| 10 | J | 60.1 | 0.119 | 0.04 | Good | 0.592 |

EXAMPLE 1

As shown in Table 1, a honeycomb structure obtained by adding 8% by mass of the microcapsules C (Test No. 3) having a packed bulk density of 0.150 g/$cm^3$ to the cordierite-forming material powder had a pore volume of 0.657 $cm^3$/g. To obtain a honeycomb structure having a pore volume of 0.657 $cm^3$/g using the microcapsules G (Test No. 7) having a packed bulk density of 0.140 g/$cm^3$, smaller than that of the microcapsules C, the amount of the microcapsules G should be more than 8% by mass. Specifically, it can be determined as follows.

7 types of honeycomb structures were produced in the same manner as in Test No. 7 except for changing the amount of the microcapsules G of Test No. 7 as shown in Table 2, and their pore volumes were measured. The results are shown in Table 2.

TABLE 2

| Packed Bulk Density (g/cm³) | Amount of microcapsules (% by mass) | Pore Volume (cm³/g) |
|---|---|---|
| 0.14 | 5.5 | 0.492 |
| 0.14 | 6.0 | 0.531 |
| 0.14 | 7.0 | 0.579 |
| 0.14 | 8.0 | 0.636 |
| 0.14 | 8.5 | 0.665 |
| 0.14 | 9.0 | 0.689 |
| 0.14 | 10.0 | 0.751 |

Figure 4:
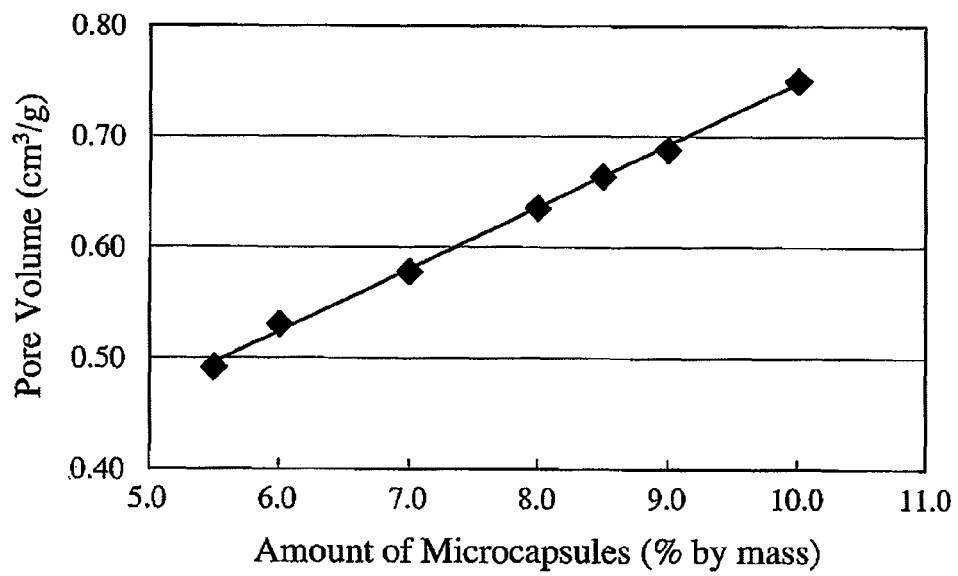
FIG. 4 is a graph showing the relation between the amount of microcapsules added and the pore volume of a honeycomb structure.

The graph of FIG. 4 shows the relation between the amount of the microcapsules G shown in Table 2 and the pore volume of the honeycomb structure. An approximated line in FIG. 4 is expressed by the equation of pore volume=0.0576×(amount of microcapsules)+0.1753. Using the microcapsules G having a packed bulk density of 0.140 g/cm³, to obtain a honeycomb structure having the same pore volume (0.657 cm³/g) as that of the honeycomb structure produced by using 8% by mass of the microcapsules C having a packed bulk density of 0.150 g/cm³, it was found that the amount of the microcapsules G added should be increased to 8.36% by mass. On the contrary, to obtain a honeycomb structure having a pore volume of 0.657 cm³/g using the microcapsules B (Test No. 2) having a packed bulk density of 0.160 g/cm³, larger than that of the microcapsules of Test No. 3, the relation between the amount of the microcapsules B and the pore volume of the honeycomb structure should also be obtained to determine the amount of the microcapsules B added.

EXAMPLE 2

The microcapsules D having a packed bulk density of 0.165 g/cm³ and the microcapsules G having a packed bulk density of 0.14 g/cm³ were mixed in equal amounts to obtain the mixed microcapsules C' having a packed bulk density of 0.149 g/cm³, substantially the same as that of the microcapsules C. A honeycomb structure produced by using the microcapsules C' in the same manner as in Test No. 3 had a pore volume of 0.655 cm³/g. Thus, the mixing of the microcapsules D and G to have an adjusted packed bulk density provided a honeycomb structure with substantially the same pore volume as that of the honeycomb structure (Test No. 3) obtained by using the microcapsules C.

EXAMPLE 3

In the honeycomb structures produced by using the microcapsules B to H having packed bulk densities of 0.13 to 0.17 g/cm³ among those used in Test Nos. 1 to 10, pore volume variations among the samples were stably as narrow as in a range of 0.611 to 0.698 cm³/g as shown in Table 1. In the honeycomb structures produced by using the microcapsules C (Test No. 3) and microcapsules E to G (Test Nos. 5 to 8) having packed bulk densities in a range of 0.14 to 0.157 g/cm³, pore volume variations were stably as narrower as 0.636 to 0.670 cm³/g.

COMPARATIVE EXAMPLE 1

As shown in Table 1, the pore volume of a honeycomb structure produced by adding a constant amount (8% by mass) of microcapsules to a cordierite-forming material powder varied in a range of 0.585 to 0.722 cm³/g depending on the packed bulk density, failing to provide the honeycomb structure with a stable performance. Particularly, the pore volumes were less than 0.6 cm³/g when the microcapsules I and J (Test Nos. 9 and 10) having packed bulk densities of less than 0.13 g/cm³ were used, and more than 0.7 cm³/g when the microcapsules A (Test No. 1) having a packed bulk density of more than 0.17 g/cm³ were used.

EXAMPLE 4

Example 1 produced 7 types of honeycomb structures by changing the amount of microcapsules G having a packed bulk density of 0.14 g/cm³ to determine the correlation between the amount of the microcapsules and the pore volume of the honeycomb structure, and this correlation can be approximated by a straight line as shown in FIG. 4. This means that two points indicating the amounts of microcapsules added can provide an equation meeting this relation. In practical application, two points are enough to obtain the equation. Further, the determination of the relation between the amount of microcapsules and the pore volume of the honeycomb structure for every lot of microcapsules having different packed bulk densities makes it possible to calculate the amount of microcapsules necessary to achieve the pore volume target depending on the packed bulk density of the microcapsules used.

Even if there were no measurement data of a pore volume at the packed bulk density of microcapsules used, the relation between the amount of microcapsules added and the pore volume of the resultant honeycomb structure can be obtained accurately by interpolation or extrapolation from known pore volumes at other packed bulk densities. For instance, if there is a line B approximating the relation between the amount of microcapsules having a packed bulk density of 0.18 g/cm³ and the pore volume, in addition to a line A approximating the relation between the amount of microcapsules having a packed bulk density of 0.14 g/cm³ shown in FIG. 4 and the pore volume, the relation between the amount of microcapsules having any packed bulk density and the pore volume can be obtained by interpolation or extrapolation from the lines A and B.

EFFECTS OF THE INVENTION

Even if microcapsules having varied properties are used, honeycomb structures can be produced with smaller pore volume variations among production lots, as compared with conventional methods adding a constant amount of microcapsules to ceramic powder. Also, a proper amount of microcapsules can be determined in a short period of time without evaluating pore properties after sintering and the unevenness of an extrusion material for every lot, unlike the conventional methods.

What is claimed is:
1. A method for producing ceramic honeycomb structures having a pore volume comprising the steps of
mixing and blending ceramic material powder with a pore-forming material composed of microcapsules A to form a moldable material, extrusion-molding the moldable material to form a ceramic honeycomb article, and drying and sintering the resultant molded honeycomb article to form a honeycomb structure A,
mixing and blending ceramic material powder with a pore-forming material composed of microcapsules B to form a second moldable material, extrusion-molding the second moldable material to form a second ceramic honeycomb article, and drying and sintering the resultant second molded honeycomb article to form a honeycomb structure B, wherein said pore-forming material consists essentially of foamed resin microcapsules constituted by a resin shell containing a gas, and wherein said microcapsules A are added to produce said honeycomb structure A in an amount M1 (% by mass) and said microcapsules B are added to produce said honeycomb structure B in an amount M2 (% by mass), wherein said honeycomb structure B has the same pore volume as said honeycomb structure A, wherein said microcapsules A have a packed bulk density Q1 (g/cm$^3$) and said microcapsules B have a packed bulk density Q2 (g/cm$^3$), such that Q1 is not equal to Q2, and wherein M2>M1, when Q1>Q2, and M2<M1, when Q1<Q2.

2. The method for producing ceramic honeycomb structures having a pore volume according to claim 1, wherein the microcapsules comprise a mixture of at least two types of microcapsules having different packed bulk densities, wherein the mixture of at least two types of microcapsules have an adjusted packed bulk density.

3. The method for producing ceramic honeycomb structures having a pore volume according to claim 1, wherein the microcapsules have a packed bulk density of 0.13 to 0.17 g/cm$^3$ at a compression force of 0.13 MPa.

4. The method for producing ceramic honeycomb structures having a pore volume according to claim 1, wherein the microcapsules have a specific surface area of 0.058 to 0.218 m$^2$/ml.

* * * * *